(12) United States Patent
Heo et al.

(10) Patent No.: US 11,505,260 B2
(45) Date of Patent: Nov. 22, 2022

(54) VEHICLE BODY

(71) Applicants: Hyundai Motor Company, Seoul (KR); Kia Corporation, Seoul (KR)

(72) Inventors: Chui Hee Heo, Hwaseong-si (KR); Tae Gyu Park, Hwaseong-si (KR); Ho Yeon Kim, Daegu (KR); Sun Hyung Cho, Suwon-si (KR); Seok Ju Gim, Seongnam-si (KR); Ji Ae Yong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/375,320

(22) Filed: Jul. 14, 2021

(65) Prior Publication Data

US 2022/0185382 A1 Jun. 16, 2022

(30) Foreign Application Priority Data

Dec. 10, 2020 (KR) .................. 10-2020-0172441

(51) Int. Cl.
| | |
|---|---|
| *B62D 25/08* | (2006.01) |
| *B62D 25/04* | (2006.01) |
| *B62D 27/06* | (2006.01) |
| *B62D 21/15* | (2006.01) |

(52) U.S. Cl.
CPC ......... *B62D 25/088* (2013.01); *B62D 21/152* (2013.01); *B62D 21/157* (2013.01); *B62D 25/04* (2013.01); *B62D 27/065* (2013.01)

(58) Field of Classification Search
CPC ...... B62D 25/08; B62D 25/04; B62D 21/152; B62D 27/065; B62D 23/005; B62D 27/023

USPC ...................... 296/193.06, 30, 198
See application file for complete search history.

(56) References Cited

U.S. PATENT DOCUMENTS

| | | | |
|---|---|---|---|
| 4,986,597 A * | 1/1991 | Clausen ................ | B62D 21/00 |
| | | | 296/205 |
| 5,209,541 A | 5/1993 | Janotik | |
| 5,549,352 A | 8/1996 | Janotik et al. | |
| 6,073,992 A | 6/2000 | Yamauchi et al. | |
| 6,282,790 B1 * | 9/2001 | Jaekel ................. | B62D 23/005 |
| | | | 296/205 |

(Continued)

FOREIGN PATENT DOCUMENTS

| | | |
|---|---|---|
| CN | 107054039 A | 8/2017 |
| KR | 19980070976 A | 10/1998 |
| WO | 2005066012 A1 | 7/2005 |

*Primary Examiner* — Dennis H Pedder
(74) *Attorney, Agent, or Firm* — Slater Matsil, LLP

(57) ABSTRACT

A vehicle body includes a plurality of shock absorber housings each covering and supporting a respective shock absorber that is configured to be connected to a respective wheel of a vehicle, a pillar member having a first end connected to one of the shock absorber housings to form a corner, wherein the pillar member connects two of the plurality of shock absorber housings to form a portion of a cabin of the vehicle, wherein the two of the plurality of shock absorber housings are disposed at a side of the vehicle at a front portion and a rear portion of the vehicle, and a supporting member disposed at the corner of the shock absorber housing, an upper end of the supporting member being coupled to the pillar member and a lower end of the supporting member being coupled to the shock absorber housing.

20 Claims, 4 Drawing Sheets

(56) References Cited

U.S. PATENT DOCUMENTS

| | | |
|---|---|---|
| 6,334,642 B1 | 1/2002 | Waldeck et al. |
| 2017/0225714 A1 | 8/2017 | Ito |

* cited by examiner

VEHICLE BODY

CROSS-REFERENCE TO RELATED APPLICATIONS

This application claims the benefit of Korean Patent Application No. 10-2020-0172441, filed on Dec. 10, 2020, which application is hereby incorporated herein by reference.

TECHNICAL FIELD

The present disclosure relates to a vehicle body.

BACKGROUND

A vehicle body needs to be designed to be able to efficiently absorb shock loads when shocks are applied to a vehicle which has various kinds of equipment mounted therein, thereby protecting the vehicle occupants.

An existing vehicle needs a space in which an engine or a battery is mounted, and a space in which wheels for vehicle driving, suspension and steering devices, and the like are mounted. Therefore, not only respective wheel housings in which respective wheels are mounted, but also a steering device connecting respective wheels, a driving device for transferring driving power, and the like occupy considerable spaces of the vehicle body. This needs to be considered during vehicle body design, which also needs to be made such that shocks applied to the vehicle can be absorbed. In addition, the more devices to be considered, the more complicated the processes for manufacturing and assembling the vehicle body become, and the more time that will be required.

However, there has recently been development of an in-wheel system in which a vehicle wheel contains a driving unit, a steering/reduction unit, and the like. Unlike conventional vehicles, the in-wheel system is not necessarily connected to each wheel. As a result, the vehicle body needs to be designed differently from existing cases. Therefore, there is a need for development of a vehicle body such that, when a vehicle adopts an in-wheel system, each wheel housing space is formed, a sufficient level of vehicle body rigidity is secured, and manufacturing and assembling processes can be further simplified.

The above description regarding the background is only for helping in understanding of the background of the present disclosure, and is not to be considered by a person skilled in the art as corresponding to already-known prior art.

SUMMARY

The present disclosure relates to a vehicle body. Particular embodiments relate to a vehicle body including at least two shock absorber housings positioned at upper ends of respective wheels of a vehicle having an in-wheel platform, pillar members coupled to upper ends of the shock absorber housings, respectively, and support members supporting the shock absorber housings and the pillar members.

Embodiments of the present disclosure can solve problems in the art, and an embodiment of the present disclosure provides a vehicle body including at least two shock absorber housings positioned at upper ends of respective wheels of a vehicle having an in-wheel platform, pillar members coupled to upper ends of the shock absorber housings, respectively, and support members supporting the shock absorber housings and the pillar members, thereby reinforcing the vehicle body rigidity through the support members, and distributing the load applied to the vehicle body.

In accordance with an embodiment of the present disclosure, a vehicle body includes at least two shock absorber housings configured to cover and support shock absorbers connected to wheels of the vehicle, a pillar member configured to form a cabin by connecting a front shock absorber housing and a rear shock absorber housing, and form a corner by connecting an end to the shock absorber housing, and a supporting member disposed at the corner of the shock absorber housing and having an upper end coupled to the pillar member and a lower end coupled to the shock absorber housing.

The supporting member may form a closed structure together with the shock absorber housing and the pillar member and provide a supporting force between the shock absorber housing and the pillar member.

The supporting member may longitudinally extend, may have closed surfaces at ends, and may be coupled in surface contact with the pillar member or the shock absorber housing through the closed surfaces.

The supporting member may extend with an internal space, may have an open surface, and may be coupled to the pillar member or the shock absorber housing through a closed surface by inserting a tool through the open surface.

The shock absorber housing may have a protrusion protruding upward from a lower end portion of the shock absorber housing, and an end of the pillar member may be coupled to the lower end portion of the shock absorber housing and an inner side surface thereof may be supported by a side wall of the protrusion of the shock absorber housing.

The supporting member may include a first supporting member of which a lower end is coupled to a side of the lower end portion of the shock absorber housing and bends laterally and upward to surround an edge of the protrusion and of which an upper end is coupled to a side surface of the pillar member, or a second supporting member of which a lower end is coupled to an edge of the lower end portion of the shock absorber housing and extends upward and of which an upper end is coupled to a side surface of the pillar member.

A first coupling portion protruding upward from the lower end portion of the shock absorber housing may be formed at the lower end portion of the shock absorber housing, and a lower end of the first supporting member may be supported by or coupled to both a side surface of the first coupling portion and an outer side surface of the protrusion of the shock absorber housing.

A second coupling portion protruding upward from the lower end portion of the shock absorber housing may be formed at the lower end portion of the shock absorber housing, and a lower end of the second supporting member may be supported by or coupled to a side surface of the second coupling portion.

A front or rear lower truss member extending and bending downward and connecting at least two shock absorber housings at a front or rear portion in a width direction of the vehicle or a lateral lower truss member extending and bending downward and connecting at least two shock absorber housings at a side of the vehicle in a longitudinal direction of the vehicle may be coupled to the shock absorber housing.

The pillar member may be coupled to the shock absorber housing at a side of the vehicle, and a lower end of the supporting member may be coupled to the shock absorber housing at the front or rear portion of the vehicle to transmit a load between the front or rear lower truss member and the pillar member or the lower end may be coupled to the shock absorber housing at a side of the vehicle to transmit a load between the lateral lower truss member and the pillar member.

A total of four shock absorber housings may be disposed at both side surfaces of the front and rear of the vehicle, one pillar member may be disposed at each of both sides of the vehicle, and the supporting member may be disposed at each of the shock absorber housings.

The shock absorber housings, the pillar members, and the supporting members may be each symmetrically disposed with respect to the center of the vehicle.

The supporting member may be coupled to the pillar member and the shock absorber housing by bolting.

A vehicle body according to embodiments of the present disclosure includes at least two shock absorber housings positioned at upper ends of respective wheels of a vehicle having an in-wheel platform, pillar members coupled to upper ends of the shock absorber housings, respectively, and support members supporting the shock absorber housings and the pillar members, thereby reinforcing the vehicle body rigidity through the support members, and distributing the load applied to the vehicle body.

BRIEF DESCRIPTION OF THE DRAWINGS

The above and other aspects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
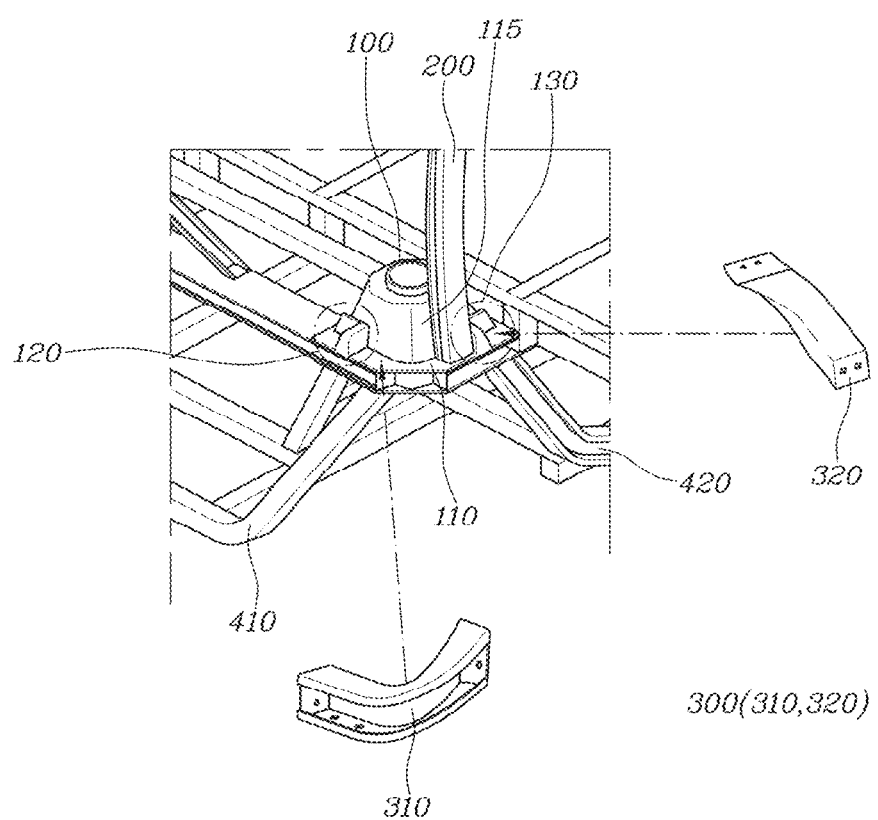
FIG. 1 is a view showing the position where a supporting member is coupled to a shock absorber housing and a pillar member in a vehicle body according to an embodiment of the present disclosure.
Figure 2:
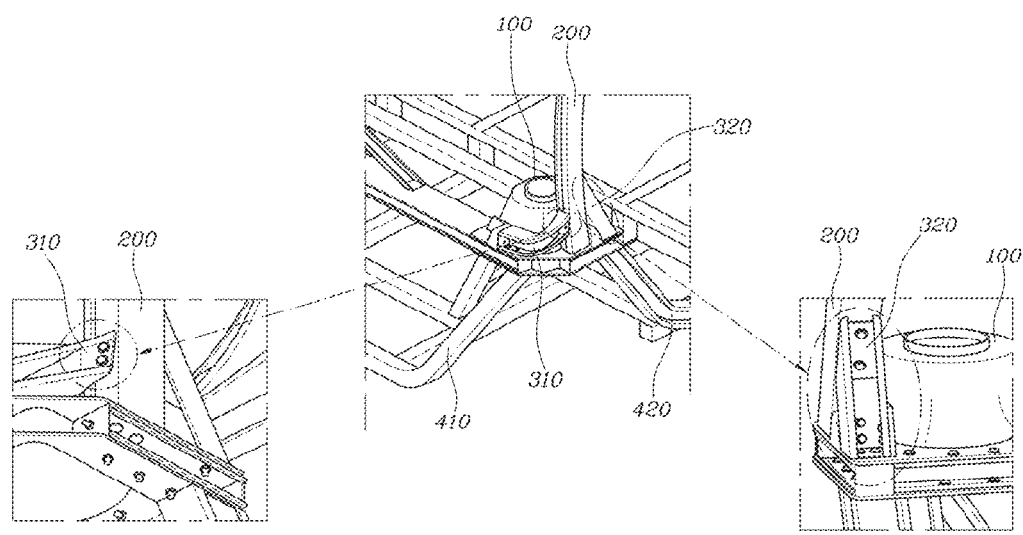
FIG. 2 is a view showing the state in which the supporting member has been coupled to the shock absorber housing and the pillar member in the vehicle body according to an embodiment of the present disclosure.
Figure 3:
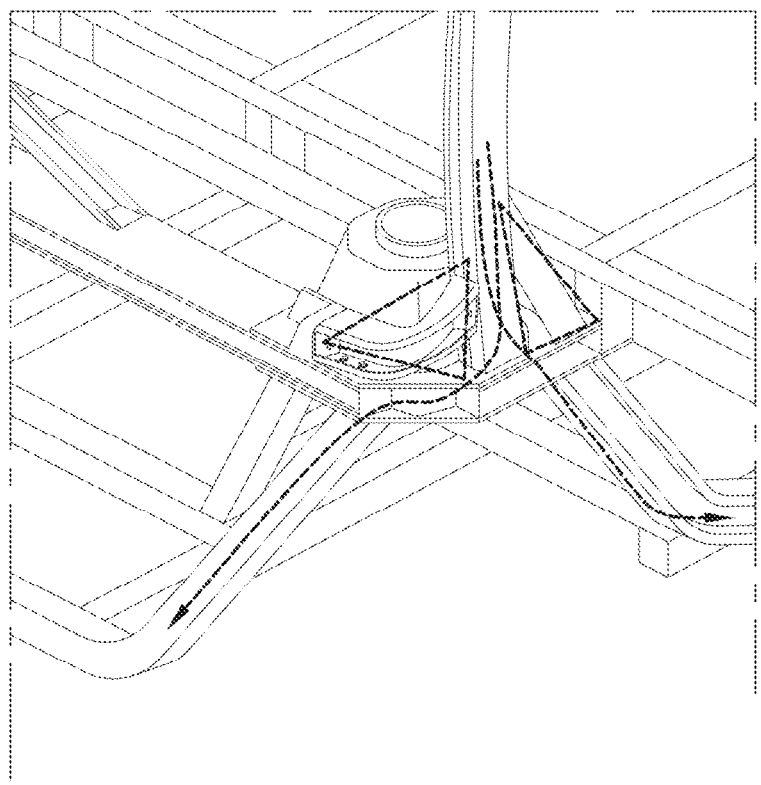
FIG. 3 is a view showing that a closed structure is configured by the supporting member and a load applied to the shock absorber housing and the pillar member is distributed in the vehicle body according to an embodiment of the present disclosure.
Figure 4:
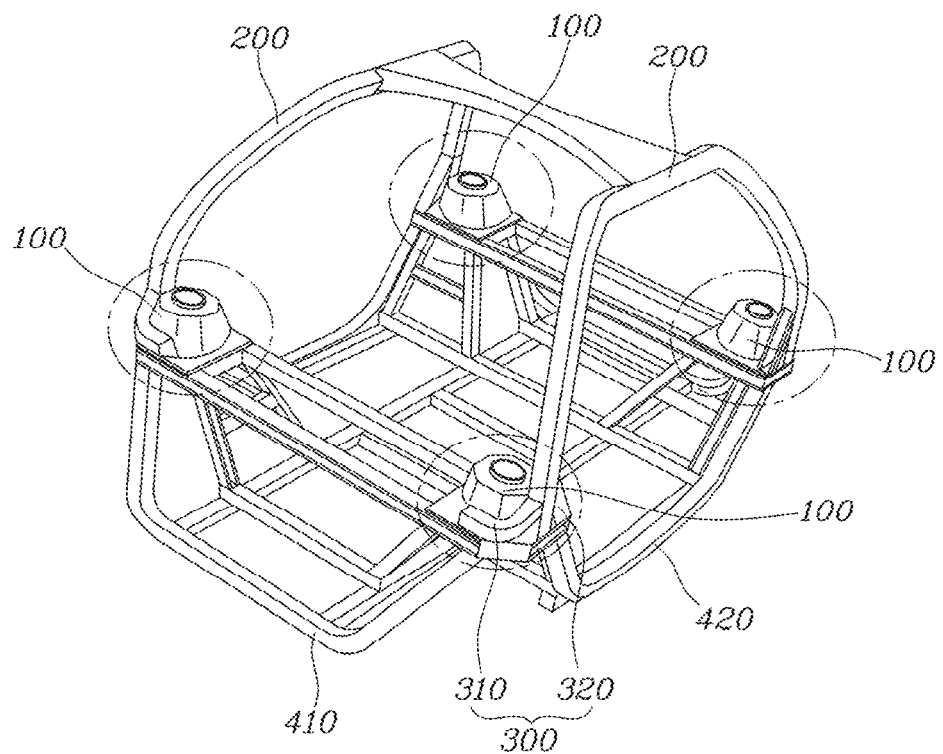
FIG. 4 is a view showing the state in which the shock absorber housing and the pillar member have been combined through a supporting member at each corner in the vehicle body according to an embodiment of the present disclosure.

FIG. 1 is a view showing the position where a supporting member is coupled to a shock absorber housing and a pillar member in a vehicle body according to an embodiment of the present disclosure. FIG. 2 is a view showing the state in which the supporting member has been coupled to the shock absorber housing and the pillar member in the vehicle body according to an embodiment of the present disclosure. FIG. 3 is a view showing that a closed structure is configured by the supporting member and a load applied to the shock absorber housing and the pillar member is distributed in the vehicle body according to an embodiment of the present disclosure. FIG. 4 is a view showing the state in which the shock absorber housing and the pillar member have been combined through a supporting member at each corner in the vehicle body according to an embodiment of the present disclosure.

A vehicle body according to an embodiment of the present disclosure includes at least two shock absorber housings 100 configured to cover and support shock absorbers connected to wheels of the vehicle, a pillar member 200 configured to form a cabin by connecting a front shock absorber housing wo and a rear shock absorber housing 100, and form a corner by being connected at an end to the shock absorber housing 100, and a supporting member 300 disposed at the corner of the shock absorber housing 100 and having an upper end coupled to the pillar member 200 and a lower end coupled to the shock absorber housing 100. The supporting member 300 may be disposed at the corner outside the shock absorber housing 100. The supporting member 300 may form a closed structure together with the shock absorber housing 100 and the pillar member 200 and may provide a supporting force between the shock absorber housing 100 and the pillar member 200.

The vehicle body according to an embodiment of the present disclosure has been designed for vehicles employing an in-wheel system rather than existing vehicles, and according to the body, it is not required to connect a driving shaft or a steering system between the wheels. Accordingly, the body is configured such that a shock absorber and a shock absorber housing 100 are disposed over each wheel of a vehicle, the wheel and the shock absorber or the shock absorber housing 100 over the wheel are protected through the shock absorber housing 100, and the supporting member 300 is able to increase the coupling strength of the shock absorber housing 100 and the pillar member 200 and is able to secure strength of the body and appropriately distribute a load in a car collision.

In detail, the pillar member 200 extends and bends upward from a side of a vehicle, thereby increasing lateral collision strength of the vehicle, forming a cabin room of the vehicle, and connecting the shock absorber housing 100 in the longitudinal direction of the vehicle. The lower end of the pillar member 200 is coupled to the shock absorber housing 100. The pillar member 200 is more firmly coupled by the supporting member 300 at the front and rear portions. When a load is applied to the pillar member 200, the pillar member 200 transmits or distributes the load to the shock absorber housing 100 or a front or rear lower truss member 410 and a lateral lower truss member 420 that are coupled to the lower end of the shock absorber housing 100 to increase front, rear, and lateral collision strength through the supporting member 300. Similarly, even though the load is applied to the shock absorber housing 100 or the front or rear lower truss member 410 and the lateral lower truss member 420, the load is distributed between the parts, whereby shock can be minimized.

In the vehicle body according to an embodiment of the present disclosure, the supporting member 300 longitudinally extends, has closed surfaces at ends, and can be coupled in close contact with the pillar member 200 or the shock absorber housing wo through the closed surfaces. Further, in the vehicle body according to an embodiment of the present disclosure, the supporting member 300 extends with an internal space, has an open surface, and can be coupled to the pillar member 200 or the shock absorber housing 100 through the closed surface by inserting a tool through the open surface.

In detail, the supporting member 300 may include two supporting members 310 and 320 disposed on a side surface and the opposite side surface of the pillar member 200. The supporting members 310 and 320 each have closed surfaces at both ends and are coupled in surface contact with the contact surface of the shock absorber housing 100 or the pillar member 200, thereby securing coupling strength. Further, each of the supporting members 310 and 320 has an open surface and is coupled to the shock absorber housing 100 or the pillar member 200 by methods including bolting by inserting a tool through the open surface when it is coupled to the shock absorber housing 100 or the pillar member 200. Therefore, according to the vehicle body of an embodiment of the present disclosure, the strength of the body is maintained and a person or a robot can easily and simply assemble each of the supporting members 310 and 320, the shock absorber housing 100, or the pillar member 200 in the assembly process.

In the vehicle body according to an embodiment of the present disclosure, the shock absorber housing 100 has a protrusion 115 protruding upward from the lower end portion 110 of the shock absorber housing 100. An end of the pillar member 200 may be coupled to the lower end portion 110 of the shock absorber housing 100 and the inner side surface thereof may be supported by a side wall of the protrusion 115 of the shock absorber housing 100. Not only is the end of the pillar member 200 coupled to the lower end portion 110 of the shock absorber housing 100, but also the inner side surface is supported by the side wall of the protrusion 115 of the shock absorber housing 100, whereby when shock is applied to the body, a larger load can be supported by the protrusion 115 of the shock absorber housing 100.

In the vehicle body according to an embodiment of the present disclosure, the supporting member 300 may include a first supporting member 310 of which the lower end is coupled to a side of the lower end portion 110 of the shock absorber housing 100 and bends laterally and upward to surround the edge of the protrusion 115 and of which the upper end is coupled to a side surface of the pillar member 200, or a second supporting member 320 of which the lower end is coupled to the edge of the lower end of the shock absorber housing 100 and extends upward and of which the upper end is coupled to a side surface of the pillar member 200.

In detail, not only are the upper end and the lower end of the first supporting member 310 coupled to the pillar member 200 and the shock absorber housing 100, but the lower end is coupled to the front surface of the rear surface of the shock absorber housing 100 and bends such that the bending portion is disposed to surround the edge of the protrusion 115 of the shock absorber housing 100, whereby the first supporting member 310 can be supported by the protrusion 115 of the shock absorber housing 100 through the bending portion. Further, the front or rear lower truss member 410 is coupled under the position where the lower end of the first supporting member 310 is coupled, whereby a load applied through the pillar member 200 can be transmitted to the front or rear lower truss member 410. Further, shock applied from in front of or behind the shock absorber housing 100 is guided to pass by the shock absorber housing 100, whereby the load can be distributed to the pillar member 200 or the lateral lower truss member 420.

The lower end of the second supporting member 320 is disposed at the edge of the shock absorber housing 100 and extends upward and the upper end thereof supports the opposite side of a side surface of the pillar member 200 connected with the upper end of the first supporting member 310, whereby front-rear coupling strength and collision strength of the pillar member 200 are secured. Further, the lateral lower truss member 420 is coupled under the position where the lower end of the second supporting member 320 is coupled, so a load applied through the pillar member 200 can be transmitted to the lateral lower truss member 420. Further, shock applied from a side of the shock absorber housing boo is guided in front of or behind the shock absorber housing 100, whereby the load can be distributed to the pillar member 200 or the front or rear lower truss member 410.

In the vehicle body according to an embodiment of the present disclosure, a first coupling portion 120 protruding upward from the lower end portion 110 of the shock absorber housing 100 is formed at the lower end portion 110 of the shock absorber housing 100. The lower end of the first supporting member 310 may be supported by or coupled to both of a side surface of the first coupling portion 120 and an outer side surface of the protrusion 115 of the shock absorber housing 100. Further, in the vehicle body according to an embodiment of the present disclosure, a second coupling portion 130 protruding upward from the lower end portion 110 of the shock absorber housing 100 is formed at the lower end portion 110 of the shock absorber housing 100. The lower end of the second supporting member 320 may be supported by or coupled to a side surface of the second coupling portion 130.

In detail, referring to FIG. 1, the first supporting member 310 and the second supporting member 320 are coupled to the shock absorber housing 100 at the portions indicated by indicating lines. The first coupling portion 120 and the second coupling portion 130 protrude upward outside the protrusion 115 from the lower end portion 110 of the shock absorber housing 100.

Referring to FIG. 2, the first coupling portion 120 and the second coupling portion 130 have the same width or breadth as the first supporting member 310 and the second supporting member 320. The first supporting member 310 has an internal space and is open on a surface facing the outside of a vehicle. The closed surface at the end of the lower end of the first supporting member 310 is coupled to a side wall of the first coupling portion 120 and the portion where the lower end portion of the first supporting member 310 is in contact with the lower end portion 110 of the shock absorber housing 100 is also coupled.

Further, the second supporting member 320 has an internal space, is open on a surface facing the inside of a vehicle, and is coupled to the portion where the closed surface at the end of the lower end portion of the second supporting member 320 is in contact with the lower end portion 110 of the shock absorber housing 100. The second supporting member 320 and the second coupling portion 130 are coupled at the portion in contact with the second coupling portion 130 at the lower end portion of the second supporting member 320 through the internal space.

As described above, the lower end portions of the first supporting member 310 and the second supporting member 320 are coupled to the shock absorber housing 100 at a plurality of positions through the internal spaces, whereby it is possible to sufficiently secure coupling strength and simplify the assembly process through easy and simple assembly.

FIG. 3 is a view showing that a closed structure is configured by the supporting member and a load applied to the shock absorber housing and the pillar member is distributed in the vehicle body according to an embodiment of the present disclosure. In the vehicle body according to an embodiment of the present disclosure, a front or rear lower truss member 410 extending and bending downward and connecting at least two shock absorber housings 100 at the front or rear portion in the width direction of the vehicle or a lateral lower truss member 420 extending and bending downward and connecting at least two shock absorber housings 100 at a side of the vehicle in the longitudinal direction of the vehicle may be coupled to the shock absorber housing 100.

In detail, the front or rear lower truss member 410 extends and bends downward at the front or rear portion of the vehicle to function as a bumper of the vehicle and is formed in a U-shape, thereby easily absorbing shock that is applied forward, rearward, and laterally. The front or rear lower truss member 410 functions as a back beam of a front or rear bumper and connects the shock absorber housings 100 in the width direction of the vehicle.

Further, the lateral lower truss member 420 extends and bends downward at a side of the vehicle to secure lateral collision strength of the vehicle, forms a cabin room together with the pillar member 200 by being coupled to the floor of the vehicle along the floor, and connects the shock absorber housings 100 in the longitudinal direction of the vehicle.

Meanwhile, in the vehicle body according to an embodiment of the present disclosure, the pillar member 200 is coupled to the shock absorber housing 100 at a side of the vehicle. Further, the lower end of the supporting member 300 is coupled to the shock absorber housing 100 at the front or rear portion of the vehicle, thereby being able to transmit a load between the front or rear lower truss member 410 and the pillar member 200. Alternatively, the lower end is coupled to the shock absorber housing 100 at a side of the vehicle, thereby being able to transmit a load between the lateral lower truss member 420 and the pillar member 200. In other words, a load path connecting the pillar member 200 to the front or rear lower truss member 410 and the lateral lower truss member 420 through the supporting member 300 is formed, and the load that is applied to the pillar member 200 is transmitted to the front or rear lower truss member 410 and the lateral lower truss member 420 along the supporting member 300. As a result, the supporting member 300 distributes the load between the parts, whereby it is possible to absorb or minimize shock that is applied to the body.

FIG. 4 is a view showing the state in which the shock absorber housing and the pillar member have been combined through a support member at each corner in the vehicle body according to an embodiment of the present disclosure. In the vehicle body according to an embodiment of the present disclosure, a total of four shock absorber housings wo are disposed at both side surfaces of the front and rear of the vehicle, one pillar member 200 is disposed at each of both sides of the vehicle, and the supporting member 300 may be disposed at each of the shock absorber housings.

Further, in the vehicle body according to an embodiment of the present disclosure, the shock absorber housing 100, the pillar members 200, and the supporting members 300 each may be symmetrically disposed with respect to the center of the vehicle. Meanwhile, in the vehicle body according to an embodiment of the present disclosure, the supporting member 300 may be coupled to the pillar member 200 and the shock absorber housing 100 by bolting.

As a result, the shock absorber housing 100, the pillar members 200, and the supporting members 300 each can be easily assembled, the coupling strength is secured, and shock that is applied forward, rearward, left, and right to the vehicle is effectively transmitted and distributed to the entire body through the parts, whereby it is possible to distribute and minimize shock that is applied to the body.

Further, the shock absorber housing 100, the pillar members 200, and the supporting members 300 are each manufactured in the same shape rather than different shapes and are symmetrically assembled in a vehicle, so it is advantageous in terms of effective assembly and production of a vehicle. Further, assembly strength and collision strength are secured and they are assembled in a simple method such as bolting through the open cross-sections or closed cross-sections, whereby the assembly process can be achieved simply within a short time by a person or a robot.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A vehicle body comprising:
a plurality of shock absorber housings each covering and supporting a respective shock absorber that is configured to be connected to a respective wheel of a vehicle;
a pillar member having a first end connected to one of the shock absorber housings to form a corner, wherein the pillar member connects two of the plurality of shock absorber housings to form a portion of a cabin of the vehicle, wherein the two of the plurality of shock absorber housings are disposed at a side of the vehicle at a front portion and a rear portion of the vehicle; and
a supporting member disposed at the corner of the shock absorber housing, an upper end of the supporting member being coupled to the pillar member and a lower end of the supporting member being coupled to the shock absorber housing.

2. The vehicle body of claim 1, wherein the supporting member forms a closed structure together with the shock absorber housing and the pillar member and is configured to provide a supporting force between the shock absorber housing and the pillar member.

3. The vehicle body of claim 1, wherein the supporting member extends longitudinally, has closed surfaces at the upper end and the lower end, and is coupled in surface contact with the pillar member and the shock absorber housing through the closed surfaces, respectively.

4. The vehicle body of claim 3, wherein the supporting member extends with an internal space, has an open surface, and is configured to be coupled to the pillar member or the shock absorber housing through the closed surface by inserting a tool through the open surface.

5. The vehicle body of claim 1, further comprising a front or rear lower truss member extending and bending downward and connecting two of the plurality of shock absorber housings disposed at the front portion or the rear portion of the vehicle in a width direction of the vehicle, wherein the front or the rear lower truss member is coupled to the shock absorber housings.

6. The vehicle body of claim 5, wherein:
the pillar member is coupled to the two of the plurality of shock absorber housings at the side of the vehicle; and
a lower end of the supporting member is coupled to the shock absorber housing at the front portion or the rear portion of the vehicle and is configured to transmit a load between the front or the rear lower truss member and the pillar member.

7. The vehicle body of claim 1, further comprising a lateral lower truss member extending and bending downward and connecting the two of the plurality of shock absorber housings at the side of the vehicle in a longitudinal direction of the vehicle, wherein the lateral lower truss member is coupled to the two of the plurality of shock absorber housings.

8. The vehicle body of claim 7, wherein the pillar member or a lower end of the supporting member is coupled to the shock absorber housing at the side of the vehicle and is configured to transmit a load between the lateral lower truss member and the pillar member.

9. The vehicle body of claim 1, wherein:
the plurality of shock absorber housings comprises a total of four shock absorber housings, the shock absorber housings being disposed respectively at both sides of the vehicle at both the front portion and the rear portion of the vehicle;
the pillar member and a second pillar member are disposed at each side of the vehicle, respectively; and
a plurality of the supporting members are provided, wherein one of the supporting members is disposed at a corresponding one of the shock absorber housings.

10. The vehicle body of claim 9, wherein the shock absorber housings, the pillar member, the second pillar member, and the supporting members are each symmetrically disposed with respect to a center of the vehicle.

11. The vehicle body of claim 1, wherein the supporting member is coupled to the pillar member and the shock absorber housing by bolting.

12. A vehicle body comprising:
a plurality of shock absorber housings each covering and supporting a respective shock absorber configured to be connected to a respective wheel of a vehicle, wherein each of the shock absorber housings includes a protrusion protruding upward from a lower end portion of the shock absorber housing;
a pillar member having a first end connected to one of the shock absorber housings to form a corner, wherein the first end of the pillar member is coupled to the lower end portion of the shock absorber housing and an inner side surface of the pillar member is supported by a side wall of the protrusion of the shock absorber housing, wherein the pillar member connects two of the plurality of shock absorber housings to form a cabin of the vehicle, and wherein the two of the plurality of shock absorber housings are disposed at a side of the vehicle at a front portion and a rear portion of the vehicle; and
a supporting member disposed at the corner of the shock absorber housing, an upper end of the supporting member being coupled to the pillar member and a lower end of the supporting member being coupled to the shock absorber housing.

13. The vehicle body of claim 12, wherein the supporting member comprises:
a first supporting member having a lower end coupled to a side of the lower end portion of the shock absorber housing and bending laterally and upward to surround an edge of the protrusion and having an upper end coupled to a first side surface of the pillar member; or
a second supporting member having a lower end coupled to an edge of the lower end portion of the shock absorber housing and extending upward and having an upper end coupled to a second side surface of the pillar member.

14. The vehicle body of claim 13, further comprising a first coupling portion at the lower end portion of the shock absorber housing and protruding upward from the lower end portion of the shock absorber, wherein a lower end of the first supporting member is supported by or coupled to both a side surface of the first coupling portion and an outer side surface of the protrusion of the shock absorber housing.

15. The vehicle body of claim 13, further comprising a second coupling portion at the lower end portion of the shock absorber housing and protruding upward from the lower end portion of the shock absorber housing, wherein a lower end of the second supporting member is supported by or coupled to a side surface of the second coupling portion.

16. A vehicle comprising:
a front shock absorber housing and a rear shock absorber housing, each covering and supporting a respective shock absorber connected to a respective one of a plurality of wheels of the vehicle;
a pillar member connecting the front shock absorber housing and the rear shock absorber housing to form a cabin of the vehicle, wherein a first end of the pillar member is connected to the front shock absorber housing or the rear shock absorber housing to form a corner;
a supporting member disposed at the corner of the front shock absorber housing or the rear shock absorber housing, wherein an upper end of the supporting member is coupled to the pillar member and a lower end of the supporting member is coupled to the front shock absorber housing or the rear shock absorber housing;
a front lower truss member extending and bending downward and connecting the front shock absorber housing to a second front shock absorber housing at a front portion of the vehicle in a width direction of the vehicle or a rear lower truss member extending and bending downward and connecting the rear shock absorber housing to a second rear shock absorber housing at a rear portion of the vehicle in the width direction of the vehicle; and
a lateral lower truss member extending and bending downward and connecting the front shock absorber housing and the rear shock absorber housings at a side of the vehicle in a longitudinal direction of the vehicle.

17. The vehicle of claim 16, wherein the supporting member forms a closed structure together with the front shock absorber housing or the rear shock absorber housing and the pillar member and is configured to provide a supporting force between the front shock absorber housing or the rear shock absorber housing and the pillar member.

18. The vehicle of claim 16, wherein the supporting member extends longitudinally, has closed surfaces at the upper end and the lower end, and is coupled in surface contact with the pillar member and the front shock absorber housing or the rear shock absorber housing through the closed surfaces, respectively.

19. The vehicle of claim 18, wherein the supporting member extends with an internal space, has an open surface, and is configured to be coupled to the pillar member or the front shock absorber housing or the rear shock absorber housing through the closed surface by inserting a tool through the open surface.

20. The vehicle of claim 16, wherein the supporting member is coupled to the pillar member and the front shock absorber housing or the rear shock absorber housing by bolting.

* * * * *

UNITED STATES PATENT AND TRADEMARK OFFICE
CERTIFICATE OF CORRECTION

| | | |
|---|---|---|
| PATENT NO. | : 11,505,260 B2 | Page 1 of 1 |
| APPLICATION NO. | : 17/375320 | |
| DATED | : November 22, 2022 | |
| INVENTOR(S) | : Chul Hee Heo | |

It is certified that error appears in the above-identified patent and that said Letters Patent is hereby corrected as shown below:

On the Title Page

Item (72); delete "Chui Hee Heo" and insert --Chul Hee Heo--.

Signed and Sealed this
Third Day of January, 2023

Katherine Kelly Vidal
*Director of the United States Patent and Trademark Office*